March 23, 1937.  G. H. FRASER  2,074,328

GEAR DRIVE AND FLEXIBLE ROLLABLE BELT

Original Filed Oct. 25, 1932  3 Sheets-Sheet 1

INVENTOR:
George Holt Fraser

March 23, 1937. G. H. FRASER 2,074,328
GEAR DRIVE AND FLEXIBLE ROLLABLE BELT
Original Filed Oct. 25, 1932 3 Sheets-Sheet 2
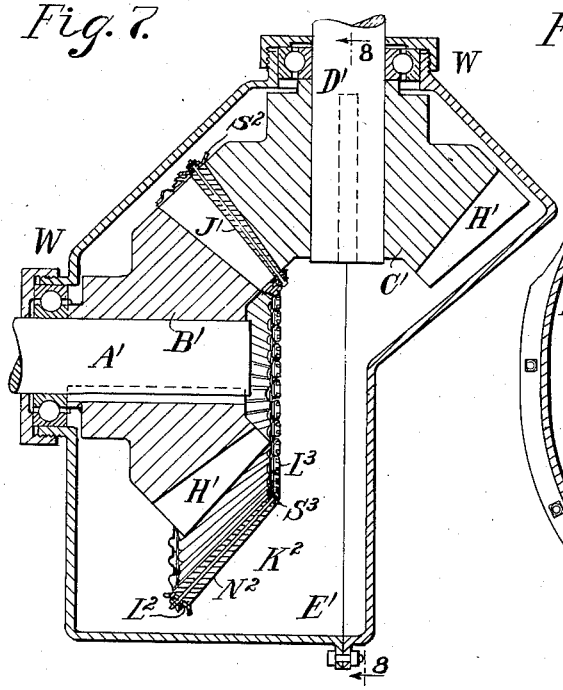
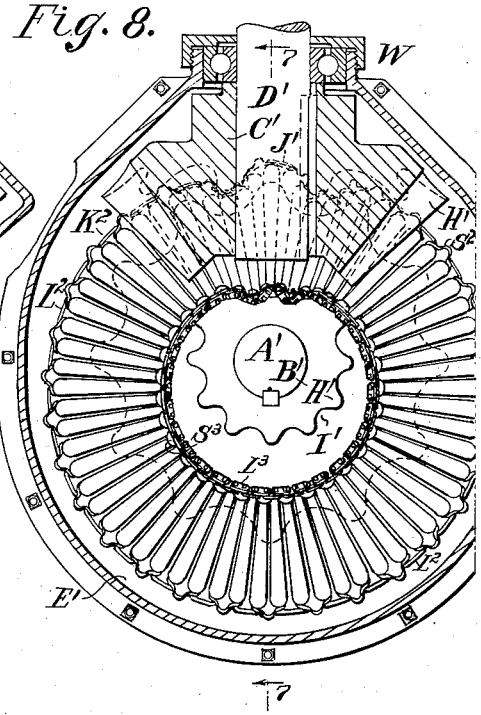
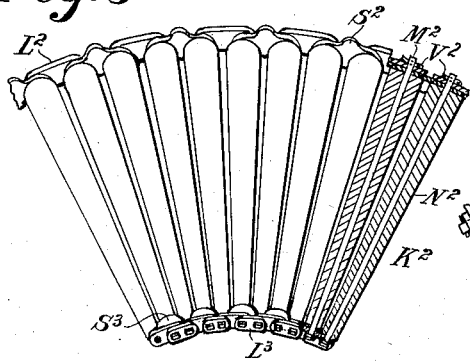
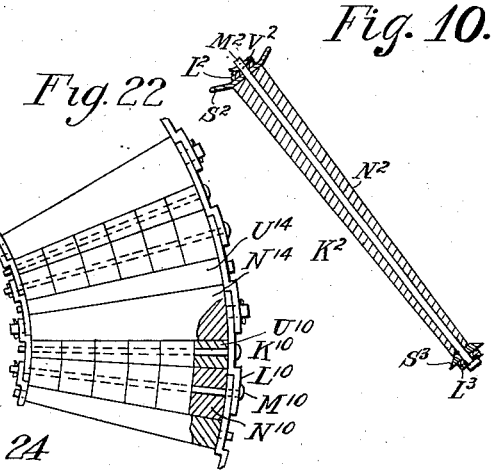
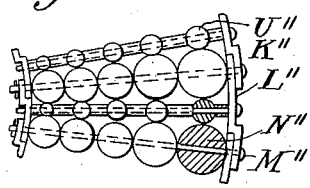
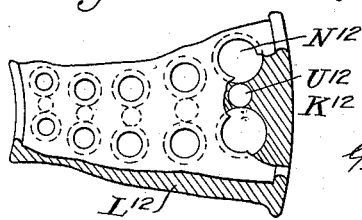
INVENTOR:
George Holt Fraser March 23, 1937. G. H. FRASER 2,074,328
GEAR DRIVE AND FLEXIBLE ROLLABLE BELT
Original Filed Oct. 25, 1932 3 Sheets—Sheet 3
Fig. 11. Fig. 12. Fig. 13.
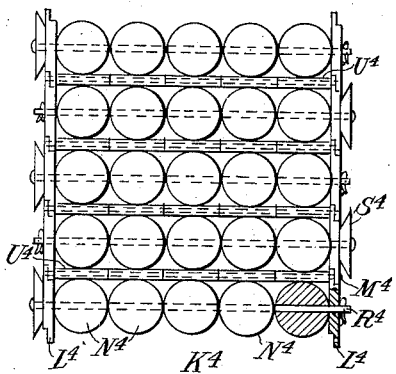 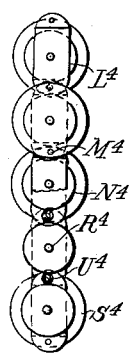 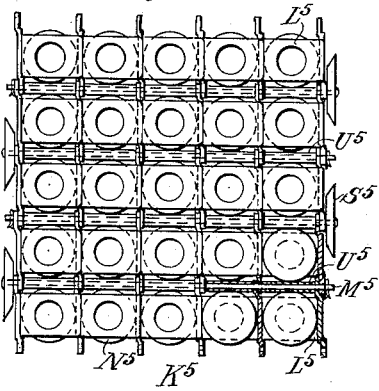
Fig. 14.
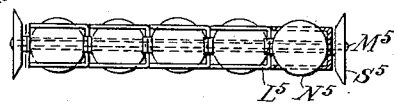
Fig. 15. Fig. 16. Fig. 17. Fig. 18.
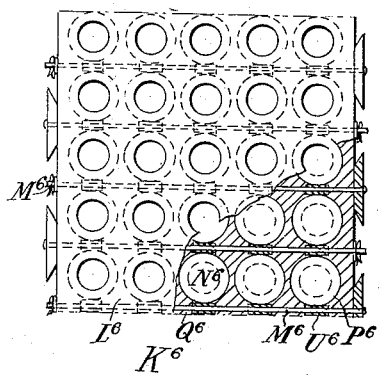 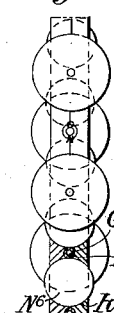 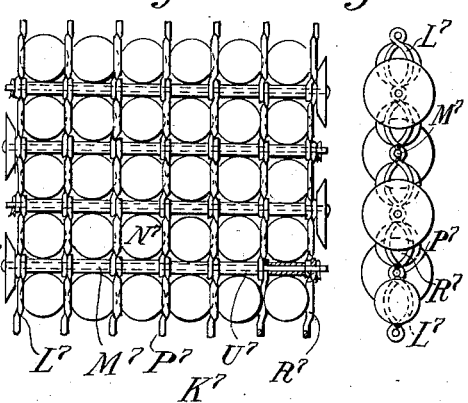
Fig. 19. Fig. 20. Fig. 21.
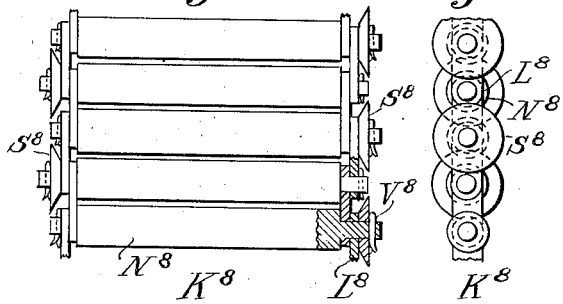 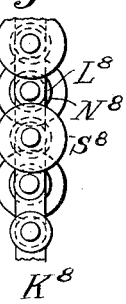 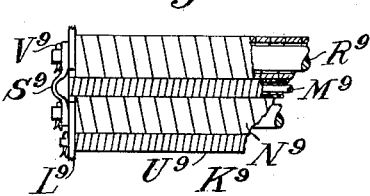
INVENTOR:
George Holt Fraser Patented Mar. 23, 1937

2,074,328

UNITED STATES PATENT OFFICE 2,074,328

GEAR DRIVE AND FLEXIBLE ROLLABLE BELT

George Holt Fraser, Brooklyn, N. Y.

Application October 25, 1932, Serial No. 639,464
Renewed June 5, 1936

20 Claims. (Cl. 74—189)

This invention relates to toothed rotary transmissions and aims to utilize rollable anti-frictional intermediaries with these.

Heretofore rollable elements of a ball or roller bearing have been annularly assembled by rigid cases or retainers holding them in the form of an endless traveling ring fitting between the male and female races of a bearing, for anti-frictionally rollably mounting a rotary shaft, but the inter-meshed teeth of spur, beveled, and other gears have been in direct frictional engagement, except for the rollable globules of oil or grease or other lubricant which it has been possible to maintain as a film between their faces, which latter have been extended to afford sufficient surface to avoid crushing such film.

My invention aims to provide a rollable flexible anti-frictional mechanical intermediary which can be used between the faces of the teeth of such gears for flexibly rollably transmitting torque between them, and for reducing friction and wear.

To this end in carrying out the preferred form of my invention I preferably provide a compression torque transmission belt utilizable as an intermediary directly between two inter-meshed teeth of a pair of gears, mitres or bevels, for anti-frictionally rollably co-operating with these at their point of working engagement, and for flexibly or loosely centrifugally or by gravity retiring from them at other points, and for flexibly conforming to the space between engaging teeth, and for dipping into a lubricant well and elevating lubricant to the working faces of the teeth.

Such a belt may be an endless flexible anti-frictional or lubricant impregnated tissue, fabric or mesh of sufficiently greater length than the circumferential pitch and circumferential convolution of the teeth of the pinion or gear it encircles, and may be made of any suitable anti-frictional material and elements and of any suitable mesh or assembly. I preferably form it of a plurality of balls or rollers connected and axially spaced by an endless chain of metal strands or flexible retainer links, and circumferentially spaced by rollable elements or pins intermediate the peripheries of successive rows of balls or rollers and pivotally uniting the adjacent ends of their retainer links. The balls or rollers may pass between the reciprocal engaged teeth of a pair of spur gears and adapt themselves to the varying sinuosity of such space and transmit torque from one tooth to the next as the gears revolve, and compressively may loosen themselves from disengaged teeth and distend centrifugally or by gravity from contact with these throughout the remaining portion of the belt and of the gear it surrounds.

Such belt preferably co-operates with the lower one of a pair of gears, and for parallel spur gears is preferably equipped with a plurality of identical balls or of cylindrical rollers, and for mitre or bevel gears is preferably equipped with tapered or conical rollers, or with balls, or other rollable members, of successively different diameter. In either case the belt is preferably equipped with guides as flared washers or links overhanging one or both sides of the gears to axially guide and position the belt relatively to the gears.

For balls the links may have reduced overlapped ends and a central body portion punched with a cylindrical hole large enough to embrace the adjacent peripheries of two balls for retaining these with their peripheries just in contact with each other and almost in contact with a rotatable spacer pin connecting the links and circumferentially spacing them all. The links may be of uniform thickness with oppositely offset ends and with oppositely bent retainer lugs punched and bent out from their hollow central portions, or they may be bent and looped wire links sufficiently encircling the peripheries of the balls to retain or position them in the mesh of the belt.

For mitre gears solid tapered rollers or other compression torque transmission rollable members, as balls, of successively different diameter, with intermediate rollable spacers may be used for heavy torque and for light torque the rollers may be tubular and the spacer pins may traverse them, and the cross-sectional thickness of the belt will increase from one side edge to its other side edge to correspond with increase of pitch between the inner and outer edge of such gears.

In the accompanying drawings, which show various adaptations of my improvements, Fig. 1 is a fragmentary vertical axial section of drive and driven shafts and gears and their casing, in co-operative relation with the preferred form of my flexible anti-frictional belt;

Fig. 7 is a fragmentary vertical axial section of drive and driven shafts and mitre gears in cooperation with my beveled gear flexible antifrictional roller belt;

Fig. 8 is a vertical axial section of the vertical gear cut on the axis of its shaft and showing the other gear and belt in elevation;

Fig. 9 is a fragmentary face view of the preferred form of my bevel gear belt partly in longitudinal mid-section;

Fig. 10 is a fragmentary cross-section thereof partly broken away in longitudinal section;

Fig. 11 is a fragmentary face view partly in longitudinal mid-section of a modified form of my improved belt;

Fig. 12 is a fragmentary edge view thereof partly in longitudinal mid-section;

Fig. 13 is a fragmentary face view partly in longitudinal section of another modified form of my improved belt;

Fig. 14 is a fragmentary cross-section thereof;

Fig. 15 is a fragmentary face view partly in longitudinal mid-section of another modified form of my improved belt;

Fig. 16 is a fragmentary edge view thereof partly in longitudinal mid-section;

Fig. 17 is a fragmentary face view partly in longitudinal mid-section showing another modified form of my improved belt;

Fig. 18 is a fragmentary edge view partly in longitudinal section thereof;

Fig. 19 is a fragmentary face view partly in longitudinal mid-section of another modified form of my improved belt;

Fig. 20 is a fragmentary edge view thereof;

Fig. 21 is a fragmentary face view of another modified form of chain, partly in longitudinal section;

Fig. 22 is a fragmentary face view of another modified form of chain, partly in longitudinal section;

Fig. 23 is fragmentary face view of another modified form of chain, partly in longitudinal section, and Fig. 24 is a fragmentary face view of another modified form of belt, partly in longitudinal section.

Figure 1:
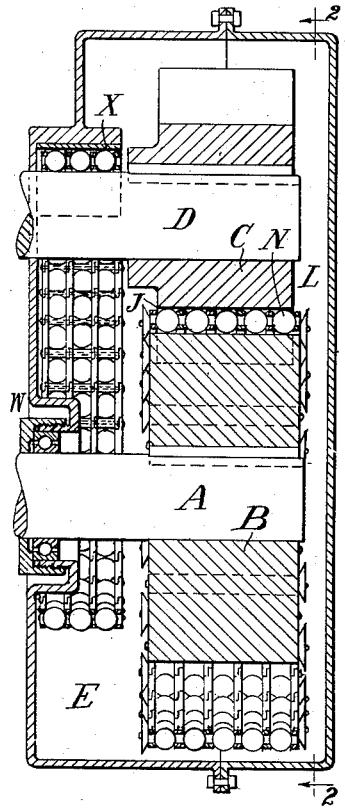
Figure 2:
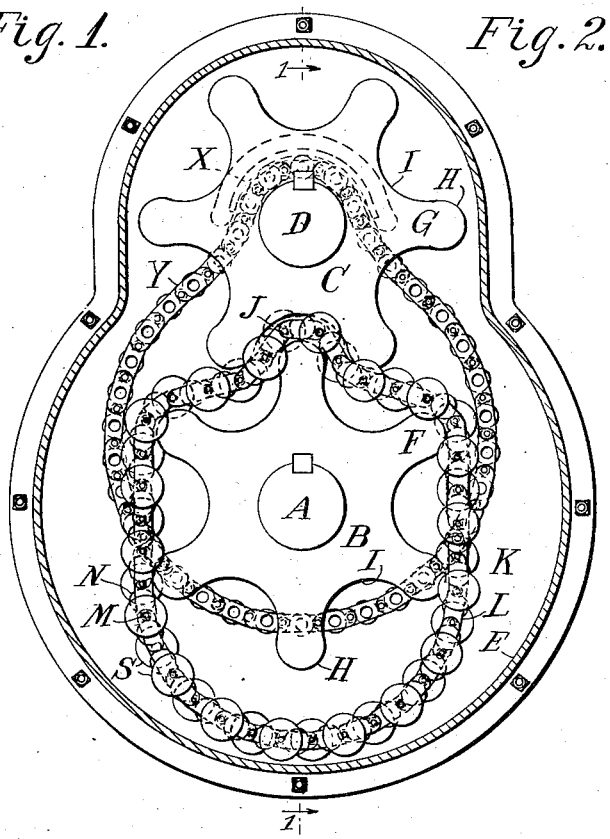
Fig. 2 is a fragmentary vertical cross-section thereof.
Figure 3:
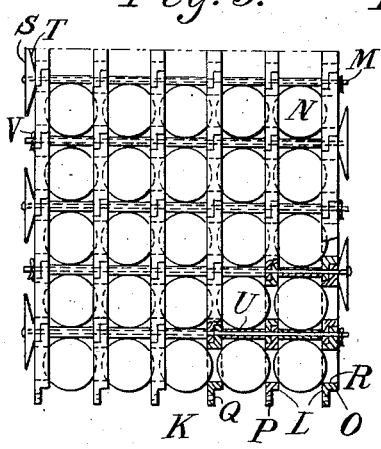
Fig. 3 is an enlarged fragmentary face view of the preferred form of my flexible ball bearing belt, partly broken away to show it in longitudinal mid-section.
Figure 4:
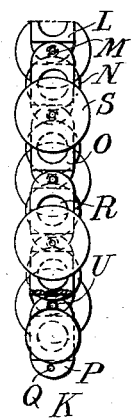
Fig. 4 is a fragmentary edge view thereof partly broken away in longitudinal section.

Referring to Figs. 1 to 4 of the drawings I will now describe in detail the preferred form of my invention as used with inter-meshed spur gears mounted on parallel horizontal shafts. In Figs. 1 to 4 let A indicate a drive shaft, B a spur gear drive pinion keyed thereto, C a spur gear driven pinion drivingly reciprocal to said drive pinion, D a driven shaft keyed to the driven pinion, and E an oil reservoir casing for these parts.

These parts may be of any usual or suitable construction for gear transmission of rotary motion. With those shown the drive shaft A is rotary and rotates the gear B which has spur teeth F reciprocal to and in drive engagement with spur teeth G of the driven pinion C for causing the latter to rotate with the gear B to rotate the shaft D.

According to one feature of my invention the reciprocal drive faces of the teeth of a pair of spur gears are spaced from one another, as by forming the spur gears with relatively small tooth ends H and with relatively large tooth cavities I, affording between the reciprocal teeth in working engagement a uniform sinuous space J, and in this space I interpose between the teeth a compression torque-stress transmission belt K. This belt is preferably sinuous, flexible, and endless, and extended around one of the spur gears and of sufficiently greater length than its toothed circumference to permit the belt to bend into the belt space between inter-meshing teeth and to depend or distend itself clear of other teeth of the spur gear it surrounds.

The belt K may be any suitable sinuous, compression torque transmission traveling member, torque transmissive in the direction of its thickness, and at right angles to its length and breadth, of greater width than thickness and of a thickness equaling the space J between the teeth and of a width equaling the width of the teeth. For parallel gears I prefer to construct it of a continuous mesh of flexibly connected axially spaced links L pivotally joined at their ends by rollable pins M, in the meshes or spaces between which links I preferably revolubly interpose rollable balls N, each of a diameter equaling the space J between the gears and sufficiently exceeding the width of the links to rollably space them from the surfaces of the gears. Thus the belt consists essentially of an endless mesh of axially spaced links, pivotally connected circumferentially by pins, and axially spaced by rollable balls flexibly retained in the interstices between them, the whole affording a flexible rollable fabric of sufficient mobility to conform to the convolutions of the inter-meshing teeth and of sufficient thickness and compressive resistance to maintain correct mesh of reciprocal teeth and to transmit torque compressively, at right angles to the length and breadth of the belt, and in the direction of its thickness, from the spaced opposed faces of two intermeshed teeth while in anti-frictional rollable engagement with them.

The mesh of the belt may be of any suitable construction, but I prefer to make the links L of punched metal having a thick body portion O and staggered reduced ends P for overlapping the corresponding ends, and to perforate these ends with a pivotal hole Q for connecting them to succeeding links, and to perforate the body O with a cylindrical socket R for receiving and embracing the adjacent periphery of adjacent balls N, and preferably of such diameter as to just permit the peripheries of such balls to contact for axially spacing them. Thus their adjoining peripheries need not be axially spaced by the link, and need only contact with it to prevent their relative axial displacement, for avoiding unnecessary peripheral friction between the balls and the link. I prefer to connect the overlapped ends of successive links by a rotatable pin M traversing the holes Q of two of the links of a row, and to proportion the sizes of the balls and the length of the links so that the peripheries of the balls shall rollably contact with the pins to resist circumferential displacement of a row of balls and to rollably transmit progressive movement of the balls from one row to the next.

According to one feature of my invention I preferably provide axial guidance retainers for resisting axial displacement of the belt even when it is used with gears mounted on parallel shafts. These retainers are especially desirable when such gears are mounted on any shafts, and preferably comprise axially resistant projections or guides at the sides of and for axial engagement with the sides of the gear teeth, preferably of the gear around which the belt is mounted, which teeth are preferably wider than those of the other gear for contacting with the guides S to maintain the belt J between the gears.

This may be accomplished by widening and flaring the outer links of the belt sufficiently to overhang the edges of the teeth, but preferably I make the guides S rotative, with beveled or flared faces T adjacent the sides of the gear for embracing it, and rotatably mount them on the ends of the pins M outwardly of the links L. Thus the guides may roll as they contact with the sides of the spur gear to anti-frictionally resist axial displacement of the belt, or to axially sustain it against gravity when the shafts are vertical. In such case the length of the belt and the projections of the guides should be such that in all positions of the belt its guides will overhang enough of the upper side of its spur gear to axially sustain the belt thereon.

For permitting substantial projection of the guides S across the sides of the spur gear I preferably alternate the guides at each side of the belt, preferably mounting those at one side rotatably on one of the pins M and those at the other side rotatably on the other end of the next of the pins M, so that the diameter of the guides S may be greater than the diameter of the balls N.

According to another feature of improvement I preferably provide an oil pocketed casing or well E below the belt K for enclosing the sag of its excess length and for containing lubricant in which the loose traveling dependent portion of the belt may dip for raising such lubricant from such well to the space between the teeth so as to utilize the belt as a compression resistant flexible traveler chain oiler for the teeth of the spur gear.

The links L are preferably made from flat sheets the one surface of which is grooved to half its depth for a width equaling the length of two of its reduced ends, after which the links are punched out of the sheet with their reduced half round ends intersecting the centre of two adjacent grooves, and their circularly perforated body portion cut from the ungrooved part of the sheet to give them the desired thickness for spacing and retaining the balls, and the desired thinness for their overlapped joints, each link being then reversed as to the next for such overlapping as their pivotal holes are threaded on the pivotal rod or pin M rotatably extended through them.

In operation a suitable strand of chain will be formed by pivotally connecting its links, on which a series of balls will be mounted, on which a second strand of links will be mounted, on which a second series of balls will be mounted, and so on until the desired width of the belt is attained, whereupon the free ends of the pins will be headed or fixed to hold these parts axially and circumferentially in relation so the end links may be separably pin connected.

The belt will then be threaded between its pinions, with its retainer guides S, when used, at each side of the latter. The detachable pin will then be inserted to connect the free ends of the belt, and both pinions will be drivingly intermeshed by the belt, whereupon drive of either shaft and its pinion will transmit rotation to the other pinion by rolling the torque transmission balls against the faces of the reciprocal teeth, which will progress the belt around its pinion flexibly into the sinuous space between the teeth, and permit it to distend by gravity or centrifugal force in advance of and successive to this space, so that except adjacent the inter-meshed teeth the belt will more or less recede from contact with the other teeth of its pinion either under the influence of gravity or of centrifugal force.

My invention is not limited to the particular details of construction, use, or combination of elements, set forth as constituting the preferred adaptation thereof, as it may be availed of in whole or in part according to such modifications as circumstances, or the judgment of those skilled in the art, may dictate, without departing from the spirit of the invention.

Figure 5:
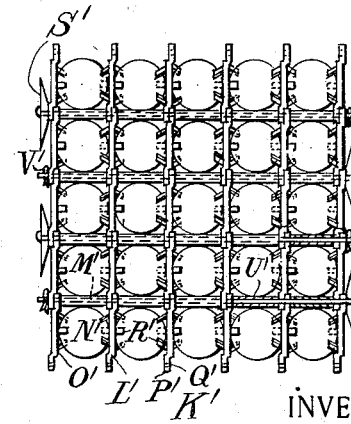
Fig. 5 is a fragmentary face view partly in longitudinal section of a modified form of my improved belt.
Figure 6:
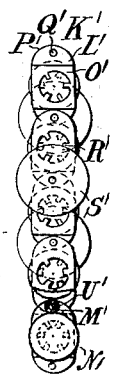
Fig. 6 is a fragmentary edge view thereof partly in longitudinal section.

One modification is shown in Figs. 5 and 6 in which the flexible belt K' has punched metal links L' having a thin perforated body portion O' and oppositely bent ends P' provided with a pivotal hole Q' for connecting them to succeeding links, and is formed with reversely bent tits R' affording between them a retainer socket for receiving the adjacent peripheries of two balls, so that these may contact with each other while being retained in axial alignment by these tits. These links are connected by pivotal pins M' on each end of which are rotatably mounted guide rollers S', and on which pins intermediate the links are rotatably mounted rotatable tubes U' contacting with the peripheries of adjacent balls for revolubly transmitting thrust from one to the other, and for spacing the balls, longitudinally of the belt.

A mitre drive modification is shown in Figs. 7, 8, 9, and 10, in which the horizontal drive shaft A' carries a drive bevel spur gear B' reciprocal to a driven bevel spur gear C' keyed to a vertical or right angle driven shaft D' enclosed by an oil well casing E'.

In such a construction according to one feature of my invention the reciprocal drive faces of the tapered teeth of a pair of bevel gears are spaced one from the other, as by forming them with relatively small tapered teeth H' and with relatively large tapered cavities I' affording between the reciprocal teeth in working engagement a tapered sinuous space or clearance J', in which I interpose between the teeth a tapered rollable anti-frictional, compression torque transmission, sinuous belt K2 around one of the bevels and of sufficiently greater length than its tooth circumference to permit the belt to bend into the belt space between the inter-meshing teeth and to depend or discharge itself clear of other teeth of the bevel gear it surrounds.

The belt K2 may be of any suitable flexile anti-frictional compression torque transmission endless rollable traveling member of a thickness equaling and corresponding to the space J' between the bevel teeth and of a width equaling the width of the face of the bevel gears. For tapered bevel gears I prefer to construct it of a continuous mesh of flexibly connected axially spaced links L2 pivotally jointed at their ends by rollable pins M2. In the meshes or spaces between these links I preferably revolubly interpose rollable tapered rollers N2, each of a tapering diameter equaling the space J' between the bevel gears, and sufficiently exceeding the width of the links to rollably space the gears from them so that the belts consist essentially of an inner and an outer endless chain of links, pivotally connected by pivotal pins, and axially spaced by rollable rollers, the whole affording a flexible rollable fabric of sufficient mobility to conform to the convolutions of the inter-meshing teeth, and of sufficient compressive resistance to maintain correct mesh of reciprocal teeth and to compressively transmit torque from one tooth to the next while in anti-frictional rollable engagement with them.

The mesh of the belt K2 may be of any suitable construction, but I prefer to make the links L2 of punched metal which will rollably retain the tapered rollers N2 in proper relation, but I prefer to make the tapered rollers N2 tubular and to rotatably mount them on axial pins M2, which are preferably rotatably mounted in a relatively large chain of outer links L2 and a relatively small chain of inner links L3, proportioned to correspond with the taper of the rollers N2 and to hold each pin in the correct position axially of its roller for rollably positioning the rollers circumferentially of the belt, so that the complete belt has one side edge longer than the other side edge, and is when distended of approximately the shape of a segment of a cone, and may hang vertically from a mitre gear, as shown in Fig. 7.

To guide the belt and resist its displacement by gravity I preferably provide the links L2 with flared guide portions or projections S2 which are preferably formed on the outer or alternate links by out-bending their sides so that they will engage the outer ends of the beveled teeth and guide the chain on to its pinion and resist downward slippage of it thereon.

To guide the chain at the inner end of the beveled teeth, and to resist tendency of the rollers to slip between the teeth I preferably provide the inner chain L3 with rollable guide rollers S3, preferably rotatably mounted on every second pin M2 so that their diameter may approximate that of the inner ends of two adjacent tapered rollers, to permit the guide rollers to have sufficient projection to rollably engage the ends of two inter-meshing gears.

In this construction the axial retainer guide rollers S3 are preferably mounted between the inner links L3 and the tubular tapered rollers N2, to rollably act against the inner edges of the spur teeth for resisting wedging action of the rollers, and to space the inner links from the spur teeth, for permitting free movement of the inner links and for preventing contact between them and the spur teeth, and the pivotal pins on which the rolls are revolubly mounted for axially spacing and positioning the latter without requiring retainer sockets in the body of the links or rollable spacers intermediate adjacent rolls, and the cotters V2 or other detachable connection for the pins M2 are connected to these pins outwardly of the large links L2, where there is ample clearance for applying or removing them to connect or disconnect the ends of the belt to apply or remove the belt or to vary its length.

In operation with this form of my invention the desired number of inner links are assembled on their pins, a guide roller is spaced on every alternate pin, the tapered rollers are slid over their pins, the flared retainer links are applied to successive pairs of pins, and the intermediate links are applied intermediate of them, and the cotters V2 or other removable fastenings are applied to the outer ends of all of the pins except those at each end of the belt, the ends being disconnected so that the belt may be threaded through the space between the spur gears, after which the free ends of the belt are connected by applying intermediate inner and outer links, whereupon it constitutes an endless flexible compression torque transmission, sinuous rollable belt rollably movable through the sinuous space between the opposed faces of two intermeshed teeth of the spaced gears for transmitting torque stress circumferentially of these, and compressively through the belt, across the space between their inter-meshed teeth.

Preferably axially adjustable bearings W are provided for one or more of the spur gears for relatively adjusting these to maintain their inter-meshing teeth in proper relation to the guides carried by the belt. These adjustable bearings are preferably provided for both gears when these have beveled teeth, to extend the clearance between their teeth for facilitating threading of the belt between the latter, and to permit adjusting the beveled teeth into correct relation with the belt, which may best be determined by operating the gears after the belt has been made endless by uniting its separable ends.

For the parallel gears shown in Fig. 1 the bearing W for the lower gear is preferably axially adjustable for adjusting such gear axially of the upper bearing, and the bearing for the upper shaft is preferably according to another feature of my invention a hemi-circular female bearing X spaced from the shaft to afford an arc-shaped space above the latter, in which space I preferably rollably mount my plain flexible rollable belt Y. The latter is preferably identical with the belt K, except that it is devoid of axial guide rollers, being guided axially in the space between the casing E and the side of the driven pinion C. The belt flexes as it comes around the shaft and then expands around the lower shaft and dips into the oil well casing for lubricating the bearing of the upper shaft as it rollably transmits stress through its thickness from the upper shaft of the bearing.

In all cases the depth of the rollable, compression torque transmission elements of the belt should equal and not exceed the space through which such elements are rollable, and if any part of the web of the belt passes through such space the thickness of such part should not exceed and should be less than the depth of such space, and preferably the rollable compression torque transmission elements extend beyond each side of the face of the web and have exposed contact portions projected beyond each face of the latter.

In the modification shown in Figs. 11 and 12 the belt K4 consists of two chains or links L4 connected by pivotal pins M4 each carrying a single rotary spacer tube U4, and the balls N4 are perforated spheres rotatably threaded on non-rotary retainer pins R4, on alternate ones of which the rollable guides S4 are rotatably mounted.

In the modification shown in Figs. 13 and 14 the web of the chain K5 consists of a plurality of perforated U-shaped links L5 pivotally connected by pins M5 alternately carrying rollable guides S5, carrying individual spacer tubes U5, and the balls N5 are solid spheres seated in the perforations of the U-shaped links.

In the modification shown in Figs. 15 and 16 the belt K6 consists of a woven fabric or pair of moulded rubber halves L6 having overhung or undercut interstices R6 in which solid spheres N6 are rotatably seated, and having pin cavities Q6 in which are mounted pivotal pins M6 carrying rollable spacer tubes U6 for rollably anti-frictionally spacing the balls.

In the modification shown in Figs. 17 and 18 the chain K7 consists of links formed of twisted wire rings L7, the eyes P7 of which are connected by pins M7 carrying individual spacer tubes U7 and the balls N7 are seated in the retainer cavities R7 afforded by the loops of the rings.

In the modification shown in Figs. 19 and 20 the belt K8 consists of two chains or links L8 pivotally connected by the ends of cylindrical rollers N8, on the alternate outer ends of which guide rollers S8 are held by cotters V8. In such construction the stress of the chain resists rotation of the rolls, which is not the case when the pivotal pins connect the links and the rolls are connected to the links intermediate such pins and are spaced by the tube or tubes rotatably mounted on such pins as in the other constructions, which relieve the rolls and links of all chain stress.

In the modification shown in Fig. 21 the chain K9 consists of links L9 pivotally connected by non-rotary rods R9 and carrying intermediate their ends non-rotary pins M9, and elastic and radially yieldable spiral wound rollers N9 are revolubly mounted on the rods R9 and spaced by similar spacer rollers U9 revolubly mounted on the pins M9, and the guide S9 is formed by outbent sides of alternate links L9, a construction in which the compression torque transmission through the thickness of the belt transmission effect is cushioned.

In the construction shown in Fig. 22 the chain K10 consists of links L10 connected by solid conical rollers N14 and solid conical spacers U14, and pivotally connected by non-rotary pins M10, some of the pins M10 carrying tubular rollers N10, consisting of a series of rollable members of successively different diameter, and some of the pins M10 carrying rollable tubular spacers U10, consisting of a series of tubular rollers of successively different diameter.

In the modification shown in Fig. 23 the chain K11 has links L11 connected by non-rotary pins M11, on alternate ones of which are threaded tubular semi-spherical balls N11, of successively different diameter, and on intermediate ones of which are threaded semi-spherical tubular spacer balls U11, of successively different diameter.

In the modification shown in Fig. 24 the belt K12 consists of a rubber web L12, and rollably movable series of solid rollable spheres or balls N12, of successively different diameter and having diametrically opposite contact portions exposed beyond the surface of the web, and intermediate rollably movable solid spacer spheres or balls U12, the balls N12 being partially circumferentially embedded in the web and the spacers U12 being completely imbedded in the web and in contact with the peripheries of longitudinally successive balls N12, for spacing these from one another longitudinally of the belt.

Although for the purpose of illustrating the herein disclosed improvements I have shown such as utilized with a belt provided with rollable spacer means between and in rollable contact with the external peripheries of longitudinally adjacent pairs of rollable members, and a belt provided with flared rollable axial restrainers which are rollable relatively to and of greater diameter than said members, such belts are not claimed as belts herein, being claimed in my companion application Serial No. 38,778, filed August 31, 1935 as a division or a continuation in part of this application.

What I claim is:

1. In rotary transmission drives, toothed drive and driven members, one rotatable and having circumferentially spaced spur teeth intermeshed with those of the other, for rotatively transmitting torque stress from one to the other of said members, said teeth of each of said members having faces opposed to and spaced from those of the other, for affording a sinuous space between opposed faces of said inter-meshed teeth, and a sinuous compression torque transmission belt, torque transmissive in the direction of its thickness and at right angles to its length and breadth, sinuously extended within the sinuous space between two of said inter-meshed teeth, and movable through said space, and intermediate and in torque stress transmission contact with the opposed faces of two thereof and adapted to transmit torque across said space in said direction and through the thickness of said belt between said opposed faces, for movably drivingly connecting said teeth.

2. In rotary transmission drives, toothed drive and driven members, one rotatable and having circumferentially spaced spur teeth intermeshed with those of the other, for rotatively transmitting torque stress from one to the other of said members, said teeth of each of said members having faces opposed to and spaced from those of the other, for affording a sinuous space between opposed faces of said inter-meshed teeth, and an endless sinuous compression torque transmission belt, torque transmissive through its thickness and in direction at right angles to its length and breadth, around and of greater length than the circumference of said rotatable member, sinuously extended within the sinuous space between two of said inter-meshed teeth, and movable through said space, and intermediate and in torque stress transmission contact with the opposed faces of two thereof, and adapted to transmit torque across said space in said direction and through the thickness of said belt between said spaced faces for movably drivingly connecting said spaced teeth.

3. In rotary transmission drives, toothed drive and driven members, one rotatable and having circumferentially spaced spur teeth intermeshed with those of the other, for rotatively transmitting torque stress from one to the other of said members, said teeth of each of said members having faces opposed to and spaced from those of the other, for affording a sinuous space between opposed faces of said inter-meshed teeth, and a sinous, flexible compression torque transmission belt, torque transmissive through its thickness and in direction at right angles to its length and breadth, sinuously extended within and flexibly movable through the sinuous space between two of said spaced inter-meshed teeth, and intermediate and in torque stress transmission contact with the opposed faces of two thereof, and adapted to transmit torque across said space in said direction and through the thickness of said belt between said faces, for drivingly connecting said spaced teeth.

4. In rotary transmission drives, toothed drive and driven members, one rotatable and having circumferentially spaced spur teeth intermeshed with those of the other, for rotatively transmitting torque stress from one to the other of said members, said teeth of each of said members having faces opposed to and spaced from those of the other, for affording a sinuous space between opposed faces of said inter-meshed teeth, and an endless flexible sinuous, compression torque transmission belt, torque transmissive in the direction of its thickness and at right angles to its length and breadth, around and of greater length than the circumference of said rotatable member, sinuously extended, within the sinuous space between two of said inter-meshed spaced teeth, flexibly movable through said space, and intermediate and in torque stress transmission contact with the opposed faces of two thereof, and adapted to transmit torque across said space in said direction and through the thickness of said belt between said faces, for drivingly connecting said spaced teeth.

5. In rotary transmission drives, toothed drive and driven members, one rotatable and having circumferentially spaced spur teeth intermeshed with those of the other, for rotatively transmitting torque stress from one to the other of said members, said teeth of each member having faces opposed to and spaced from those of the other, for affording a sinuous space between opposed faces of said inter-meshed teeth, and an antifrictional, sinuous, compression torque transmission belt, torque transmissive through its thickness and in direction at right angles to its length and breadth within and sinuously extended through the sinuous space between two of said inter-meshed spaced teeth, anti-frictionally movable through said space, and intermediate and in torque stress transmission contact with the opposed faces of two thereof, and adapted to antifrictionally transmit torque across said space in said direction and through the thickness of said belt between said faces, for anti-frictionally drivingly connecting said inter-meshed spaced teeth.

6. In rotary transmission drives, toothed drive and driven members, one rotatable and having circumferentially spaced spur teeth intermeshed with those of the other, for rotatively transmitting torque stress from one to the other of said members, said teeth of each of said members having faces opposed to and spaced from those of the other, for affording a sinuous space between opposed faces of said inter-meshed teeth, and an endless anti-frictional, sinuous, compression torque transmission belt, torque transmissive through its thickness and in direction at right angles to its length and breadth, around and of greater length than the circumference of said rotatable member, within and sinuously extended through the sinuous space between two of said inter-meshed spaced teeth, anti-frictionally sinuously movable through said space, and in torque transmission contact with the opposed faces of two thereof, and adapted to transmit torque in said direction and through the thickness of said belt across said space between said faces, for anti-frictionally movably drivingly connecting said inter-meshed spaced teeth.

7. In rotary transmission drives, toothed drive and driven members, one rotatable and having circumferentially spaced spur teeth intermeshed with those of the other, for rotatively transmitting torque stress from one to the other of said members, said teeth of each of said members having faces opposed to and spaced from those of the other, for affording a sinuous space between opposed faces of said inter-meshed teeth, and a centrifugally distendable endless flexible slack sinuous, compression torque transmission belt, torque transmissive in the direction of its thickness and at right angles to its length and breadth, around and of greater length than the circumference of said rollable member, within and sinuously extended throughout the sinuous space between two of said inter-meshed spaced teeth, sinuously movable through said space, and in torque transmission contact in said space with the opposed faces of two thereof, and adapted to transmit torque in said direction and through the thickness of said belt across said space between said spaced faces, for movably drivingly connecting said inter-meshed spaced teeth, and centrifugally distendable without said space out of contact with others of said teeth, for clearing the latter.

8. In rotary transmission drives, toothed drive and driven members one rotatable and having circumferentially spaced spur teeth intermeshed with those of the other, for rotatively transmitting torque stress from one to the other of said members, said teeth of said members having faces opposed to and spaced from those of the other, for affording a sinuous space between opposed faces of said inter-meshed teeth, axially resistant belt retainer means axially of and adjacent said teeth, for axially defining the space between said teeth, and an axially retained sinuous, compression torque transmission belt, stress transmissive in the direction of its thickness and at right angles to its length and breadth, sinuously extended through said space, axially retained therein by said retainer means, sinuously movable through said space, and in torque stress transmission contact in said space with the opposed faces of two of said inter-meshed spaced teeth, and adapted to transmit torque across said space in said direction and through the thickness of said belt between said opposed faces, for drivingly connecting said inter-meshed spaced teeth during said axial retention.

9. In rotary transmission drives, toothed drive and driven members one rotatable and having circumferentially spaced spur teeth intermeshed with those of the other, for rotatively transmitting torque stress from one to the other of said members, said teeth of each of said members having faces opposed to and spaced from those of the other, for affording a sinuous space between opposed faces of said inter-meshed teeth, and an axially restrained sinuous, compression torque transmission belt, torque transmissive in the direction of its thickness and at right angles to its length and breadth, sinuously extended through said space, axially restrained therein and sinuously movable therethrough, in torque stress transmission contact with the opposed faces of two of said inter-meshed spaced teeth, and adapted to transmit torque across said space in said direction and through the thickness of said belt between said spaced faces, for drivingly connecting said teeth during said axial restraint.

10. In rotary transmission drives, toothed drive and driven members, one rotatable and having circumferentially spaced spur teeth intermeshed with those of the other, for rotatively transmitting torque stress from one to the other of said members, said teeth of said members having faces opposed to and spaced from those of the other, for affording a sinuous space between opposed faces of said inter-meshed teeth, a lubricant well below and in communication with said rotatable member, and an endless flexible dependent, sinuous, compression torque transmission belt, torque transmissive in the direction of its thickness and at right angles to its length and breadth, around and of greater length than the circumference of and dependable below said rotatable member, within and sinuously extended through the sinuous space between two of said inter-meshed spaced teeth, sinuously movable through said space, and in torque transmission contact with the opposed faces of two thereof, and adapted to transmit torque across said space in said direction and through the thickness of said belt between said spaced faces, for movably drivingly connecting said teeth, and movably dependent in said well, for transmitting lubricant from said well to said teeth, for lubricating said belt.

11. In rotary transmission drives, beveled toothed drive and driven members, one rotatable and having circumferentially spaced teeth in intermeshed relation with those of the other, for rotatively transmitting torque stress from one to the other of said members, said teeth of each of said members having faces opposed to and spaced from those of the other, for affording a circumferential space between opposed faces of said teeth, and a transmission belt between said members, within the circumferential space between two of said teeth, movable through said space, and in torque transmission contact with the opposed faces of two of said teeth, and adapted to transmit torque across said space between said opposed faces, for drivingly connecting said teeth.

12. In rotary transmission drives, beveled toothed drive and driven members, one rotatable and having diverged circumferentially spaced spur teeth in intermeshed relation with those of the other, for rotatively transmitting torque stress from one to the other of said beveled members, said teeth of each of said members having faces opposed to and spaced from those of the other, for affording a divergent space between opposed faces of said teeth, a belt of greater width than thickness and of greater thickness at one side edge than at the other, between said beveled members, within the divergent space between two of said teeth, movable through said space, in torque transmission contact with the opposed faces of two of said beveled teeth, and adapted to transmit torque across said divergent space and between said opposed faces, for drivingly connecting the divergent portions of two of said teeth.

13. In rotary transmission drives, beveled toothed drive and driven members, one rotatable and having divergently circumferentially spaced teeth in intermeshed relation with those of the other, for rotatively transmitting torque stress from one to the other of said members, said teeth of each of said members having faces opposed to and spaced from those of the other, for affording a wedge shaped circumferential space between opposed faces of said teeth, and a belt of greater width than thickness and of wedge shaped cross-section from one side edge to its other side edge, between said members, within the wedge shaped space between two of said teeth, movable through said space, and in torque transmission contact with the opposed faces of two of said teeth, and adapted to transmit torque across said space and between said opposed faces, for drivingly connecting said teeth.

14. In rotary transmission drives, beveled toothed drive and driven members, one rotatable and having spaced circumferential teeth in intermeshed relation with those of the other, for rotatively transmitting torque stress from one to the other of said members, said teeth of each of said members having faces opposed to and spaced from those of the other for affording circumferential spaces between opposed faces of said teeth, and a compression torque transmission belt, torque transmissive in the direction of its thickness and at right angles to its length and breadth, between said members, said teeth movable through said space, and in torque transmission contact with said opposed faces and adapted to transmit torque across said space in said direction and through the thickness of said belt between said opposed faces, for drivingly connecting said teeth.

15. In rotary transmission drives, beveled toothed drive and driven members, one rotatable and having diverged spaced circumferential teeth in intermeshed relation with those of the other, for rotatively transmitting torque stress from one to the other of said members, said teeth of each of said members having faces opposed to and spaced from those of the other for affording circumferential spaces between said opposed faces, and a torque transmission belt of greater width than thickness around and of greater length at one side edge than at its other side edge, between said members, within the space between two of said teeth, movable through said space, and in torque transmission contact with the opposed faces of two of said teeth, and adapted to transmit torque across said space and between said opposed faces, for drivingly connecting said teeth.

16. In rotary transmission drives, rotatable drive and driven members having circumferentially spaced inter-meshed circumferential spur teeth, for rotatively transmitting torque stress from one to the other of said members, said teeth of each of said members having faces opposed to and spaced from those of the other, for affording a sinuous space between opposed faces of said inter-meshed teeth, and a flexible sinuous, compression torque transmission belt, torque transmissive through its thickness and in direction at right angles to its length and breadth, sinuously extended between said members, within and sinuously flexibly movable through the sinuous space between two of said inter-meshed spaced teeth, and in torque transmission contact with the opposed faces of two thereof, and adapted to transmit torque across said space at right angles to said length and breadth of and through the thickness of said belt between said opposed faces, for movably drivingly meshing said teeth, said belt comprising a longitudinal series of flexibly connected rollable diametric stress resistant members having diametrically opposite exposed contact portions exposed in the direction of the thickness of said belt and in contact with said opposed faces respectively, and adapted to receive torque from one of said opposed faces and to rollably transmit it across the thickness of said belt to the other thereof, and a flexible web for said rollable members on which the latter are rollably mounted in successive relation longitudinally of said web, adapted to successively and flexibly rollably connect said rollable members, for transmitting sinuous and rollable movement thereof, between said teeth.

17. In rotary transmission devices, rotatable drive and driven members having circumferentially spaced inter-meshed circumferential spur teeth, for rotatively transmitting torque stress from one to the other of said members, said teeth of each of said members having faces opposed to and spaced from those of the other, for affording a sinuous space between opposed faces of two of said inter-meshed teeth, and a flexible, sinuous, compression torque transmission belt, torque transmissive through its thickness and in direction at right angles to its length and breadth, within and sinuously extended throughout the sinuous space between two of said inter-meshed spaced teeth, and movable through such space, and in stress transmission contact with the opposed faces of two thereof, and adapted to transmit torque across said space, at right angles to the length and breadth of and through the thickness of said belt, between said opposed faces, for movably drivingly connecting said teeth, said belt comprising a plurality of laterally disposed rows of longitudinally successive rollable members flexibly longitudinally connected and having diametrically opposite exposed torque transmission contact portions, exposed in the direction of the thickness of said belt, and adapted to receive torque at one side of said belt and to transmit it across the thickness of said belt, rollably mounted in successive relation longitudinally and laterally, adapted to successively longitudinally position and to rollably laterally position said rollable members, and to permit sinuous and rollable movement of the latter, said belt being of less thickness than the diameter of said members, for exposing said contact portions beyond the thickness of said belt.

18. In rotary transmissions, rotatable drive and driven members having circumferentially spaced inter-meshed circumferential spur teeth, for rotatably transmitting torque stress from one to the other of said members, said teeth of each of said members having faces opposed to and spaced from those of the other, for affording a sinuous space between opposed faces of said inter-meshed teeth, a flexible sinuous, compression torque transmission belt, torque transmissive in the direction of its thickness and at right angles to its length and breadth, sinuously extended within and sinuously flexibly movable within and through the sinuous space between two of said inter-meshed teeth, and in torque transmission contact with the opposed faces of two thereof, and adapted to transmit torque across said space in said direction at right angles to the length and breadth of and through the thickness of said belt between said faces, for flexibly movably drivingly connecting said faces, said belt comprising a plurality of flexibly longitudinally connected rollable spheres having diametrically opposite exposed contact portions, exposed in the direction of the thickness of said belt, and adapted to receive torque at one side of the latter and to transmit it across said space, through the thickness of said belt to the other side of the latter and a longitudinally flexible web on which said rollable spheres are successively rollably mounted longitudinally, adapted to longitudinally position and to flexibly rollably connect the latter, for permitting sinuous and rollable movement thereof, and of less thickness than the diameter of said spheres, for exposing said contact portions through the thickness of said belt.

19. In rotary transmissions, rotatable drive and driven members having circumferentially spaced intermeshed circumferential spur teeth, for rotatably transmitting torque stress from one to the other of said members, said teeth of each of said members having faces opposed to and spaced from those of the other, for affording a sinuous space between opposed faces of said intermeshed teeth, a flexible, sinuous, compression torque transmission belt, torque transmissive in the direction of the thickness of said belt and at right angles to its length and breadth, sinuously extended within and sinuously flexibly movable within and through the sinuous space between two of said inter-meshed teeth, and in torque transmission contact with the opposed faces of two thereof, and adapted to transmit torque across said sinuous space in said direction and through the thickness of said belt between said opposed faces, for flexibly movably drivingly connecting said spaced teeth, said belt comprising a plurality of laterally disposed rows of longitudinally successive flexibly longitudinally connected rollable spheres having diametrically opposite exposed contact portions, exposed in the direction of the thickness of said belt, and adapted to receive torque at one side of the latter and to transmit it across said space through the thickness of said belt, to the other side of the latter and a longitudinally flexible web on which said rollable spheres are successively mounted, adapted to longitudinally position and to flexibly rollably connect the latter for permitting sinuous and rollable movement thereof and of less thickness than the diameter of said spheres, for exposing said contact portions through the thickness of said belt.

20. In rotary transmission devices, rotatable drive and driven members having circumferentially spaced inter-meshed circumferential spur teeth, for rotably transmitting torque stress from one to the other of said members, said teeth of each of said members having faces opposed to and spaced from those of the other, for affording a sinuous space between opposed faces of two of said inter-meshed teeth, and a flexible, sinuous, compression torque transmission belt, torque transmissive in the direction of its thickness and at right angles to its length and breadth, sinuously extended within and sinuously movable within the sinuous space between two of said spaced teeth, and in torque transmission contact with the opposed faces of two thereof, and adapted to transmit torque across said space in said direction, and through the thickness of said belt, between said opposed faces, for movably drivingly connecting said teeth, said belt comprising a plurality of laterally disposed rows of longitudinally successive rollable spheres flexibly longitudinally connected and having diametrically opposite exposed torque transmission contact portions, exposed in the direction of the thickness of said belt, and adapted to receive torque at one side of the latter and to transmit it across said space and through the thickness of said belt, to the other side thereof and a flexible web around other portions of said rollable spheres and in which said other portions are rollably mounted in successive relation longitudinally and laterally of said web, adapted to successively flexibly rollably position said spheres from other than said contact positions, said web being of less thickness than the diameter of said spheres, for exposing said contact portions beyond the thickness of said web.

GEORGE HOLT FRASER.